United States Patent [19]

Bass et al.

[11] Patent Number: 4,641,364
[45] Date of Patent: Feb. 3, 1987

[54] FUNCTION CODING VIA DIGITAL ADDRESSES IN A TWO-WAY SYSTEM

[75] Inventors: Robert H. Bass, Sunrise; Macko, Tamarac; Robert K. Lockhart, Jr., Lauderhill, all of Fla.

[73] Assignee: Motorola, Inc., Schaumburg, Ill.

[21] Appl. No.: 967,762

[22] Filed: Dec. 8, 1978

[51] Int. Cl.⁴ ............................................. H04B 7/00
[52] U.S. Cl. .......................................... 455/32; 455/53
[58] Field of Search ...................... 455/32, 33, 34, 39, 455/35, 36, 49, 53, 54; 340/311, 312, 313, 314, 146.2; 364/200 MS File, 900 MS File; 370/96, 95; 371/27, 29, 70

[56] References Cited

U.S. PATENT DOCUMENTS

| | | | |
|---|---|---|---|
| 3,855,576 | 12/1974 | Braun | 340/146.2 |
| 4,103,107 | 6/1978 | D'Amico et al. | 340/311 |
| 4,103,296 | 7/1978 | Nicolini et al. | 340/311 |
| 4,160,240 | 7/1979 | Partipilo | 371/29 |
| 4,247,908 | 1/1981 | Lockhart, Jr. | 455/31 |

FOREIGN PATENT DOCUMENTS 1012223  9/1972  Canada .......................... 340/311

Primary Examiner—Tommy P. Chin
Attorney, Agent, or Firm—James W. Gillman; Margaret M. Parker

[57] ABSTRACT

Increased efficiency in the use of a communications channel between a Control Unit and a multiplicity of terminal or satellite units by utilizing the combinations of the unit address code words and their complements as coded commands and automatically returned responses. At least one combination of the Control Unit address code words and word complements can be manually entered at any one of the satellite units to serve as a special response to one combination of the respective satellite address code words and word complements, to cause a change of function or operation at the Control Unit. The system may be coupled to a Host Computer and normally the information received by the Control Unit would be encoded for transmission to the computer, in which case the change of function could be the disenabling of transmission to the Host Computer.

6 Claims, 5 Drawing Figures

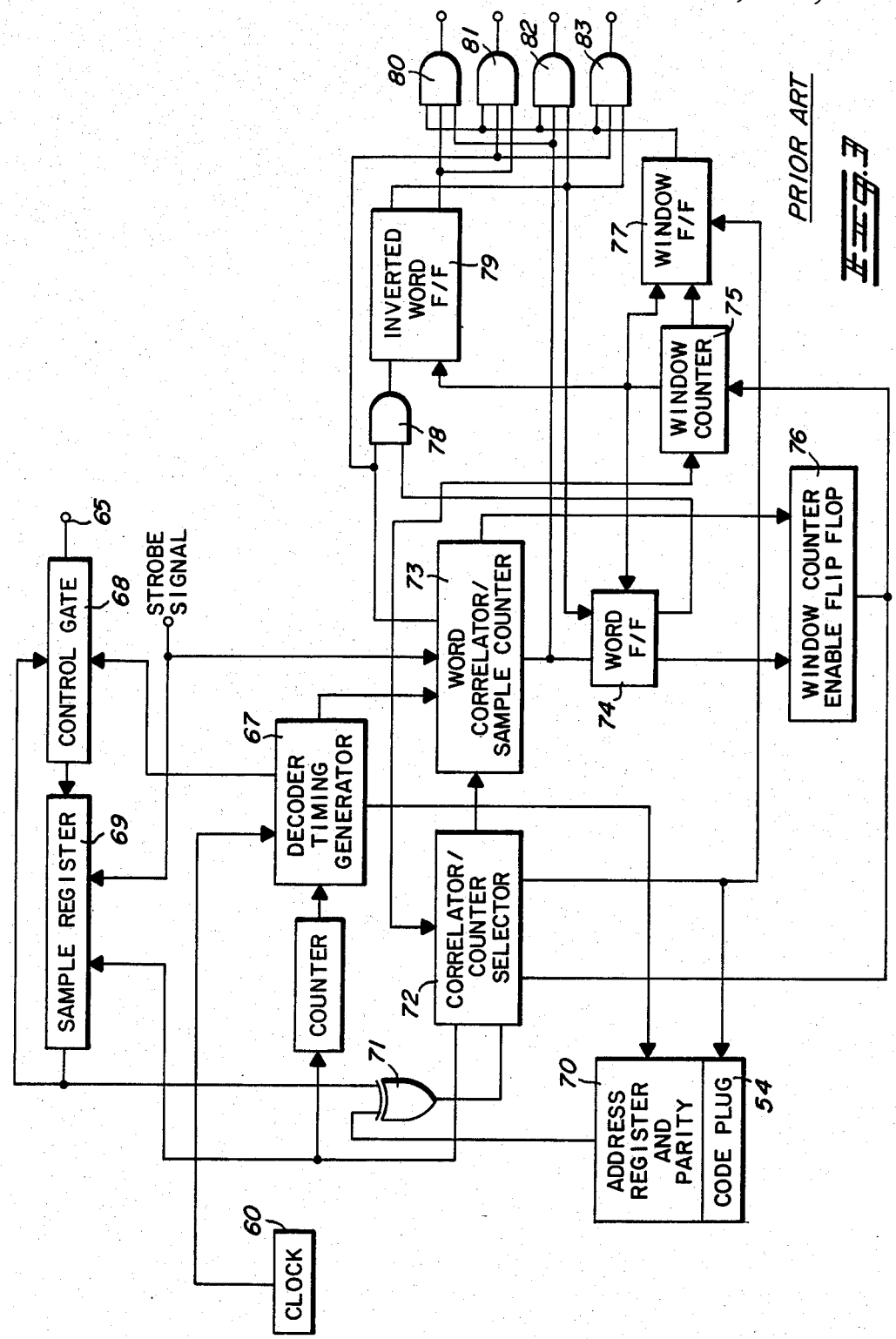

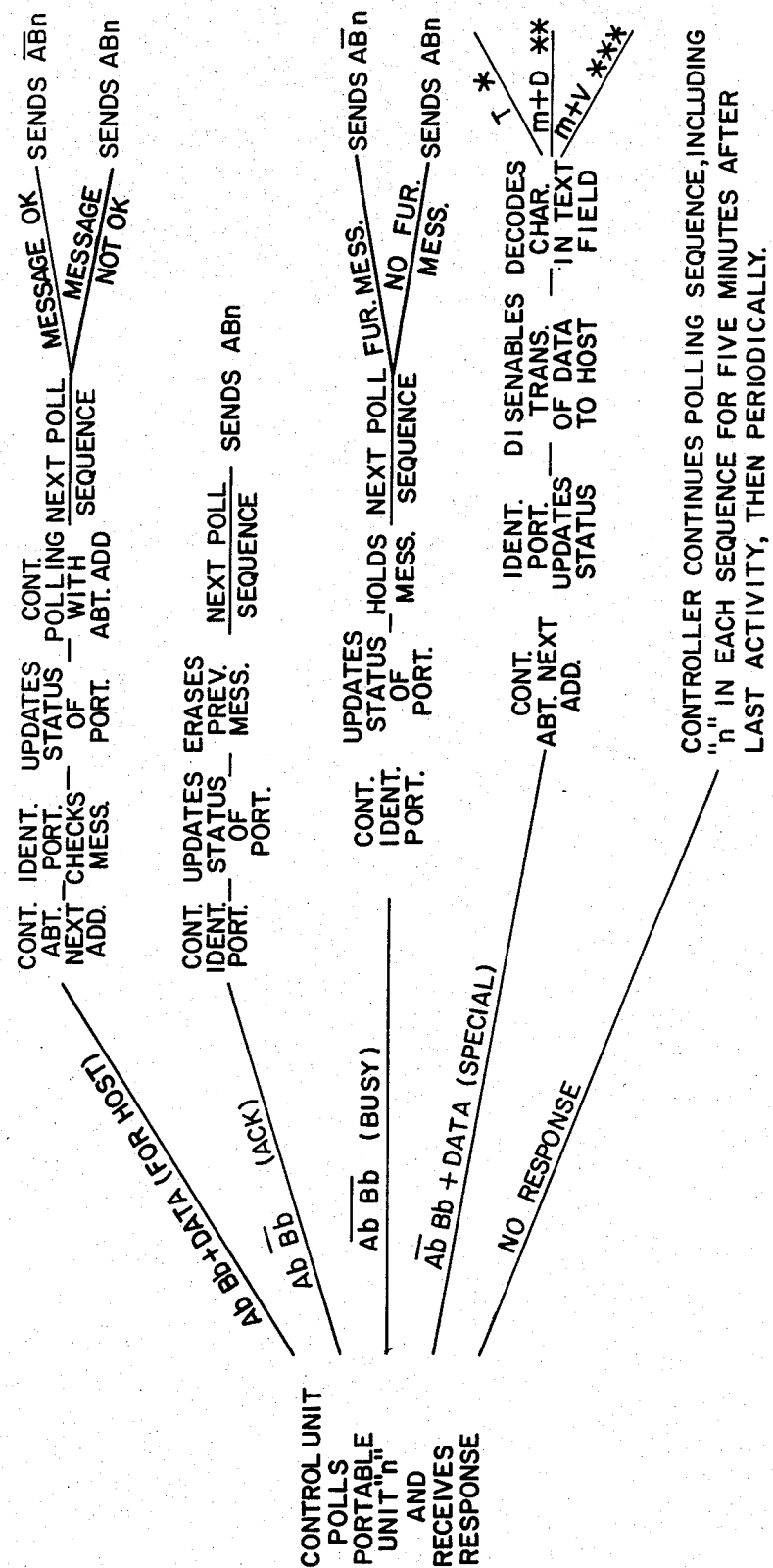

FUNCTION CODING VIA DIGITAL ADDRESSES IN A TWO-WAY SYSTEM

BACKGROUND OF THE INVENTION

This invention relates to the field of two-way communication between a control unit and multiple terminal units, and more particularly to increased efficiency in the use of the communications channel.

There are many present day systems involving communications between a master unit of some sort and a number of satellite units, all over a single channel. Both spectrum requirements and economics require that a channel be used with maximum efficiency and there are various systems for improving efficiency. One of these is utilized in a paging system described in U.S. Pat. No. 3,855,576, and assigned to the same assignee as is the present invention. In the patented system each pager has a unique binary-coded address, consisting of two "words", and the combinations of those words and their complements are recognized by the pager and a pre-assigned character is displayed for each combination received. Each character displayed signifies a predetermined message such as "Call your office".

It would be highly advantageous if such a coding scheme could be applied to a two-way system whereby a reception by first unit of a combination of its address code words could evoke a transmission to a second unit of the appropriate combination of the address of the second unit. It would also be advantageous if at least one combination of the code of the second unit could be used to disenable normal function of the second unit and enable special functions.

SUMMARY OF THE INVENTION

It is therefore an object of the present invention to provide increased efficiency in a single channel two-way link between the control unit and multiple terminal units. It is another object to provide such efficiency in the system when it is coupled to a master computer. It is a particular object to accomplish this by utilizing the detection of the combination of the respective address code words and their complements to initiate desired actions and/or responses at the receiving unit.

It is another particular object to enable special functions by means of one of the combinations.

It is a more specific object to use that one combination to disenable the transfer of information to the master computer and to enable various functions between terminals or between controller and terminal.

These objectives and others are provided in a system in accordance with the present invention wherein each of a control unit and multiple terminal units in a two-way communication system has a unique two word binary coded address and each unit can detect its own address words and the complements of each address word. Each unit contains a microprocessor and its associated memory. Reception by a terminal unit of its first address word or the complement followed by its second address word or its complement causes the terminal unit to check its memories and, on the basis of the data stored therein, to send back to the control unit the appropriate response encoded in a combination of the control unit address code words.

BRIEF DESCRIPTION OF THE DRAWING

FIG. 3 is a block diagram taken from the prior art relating to address recognition.

FIG. 4 is flow chart relating to a portable unit.

FIG. 5 is a flow chart relating to a Control Unit.

DETAILED DESCRIPTION OF A PREFERRED EMBODIMENT

Figure 1:
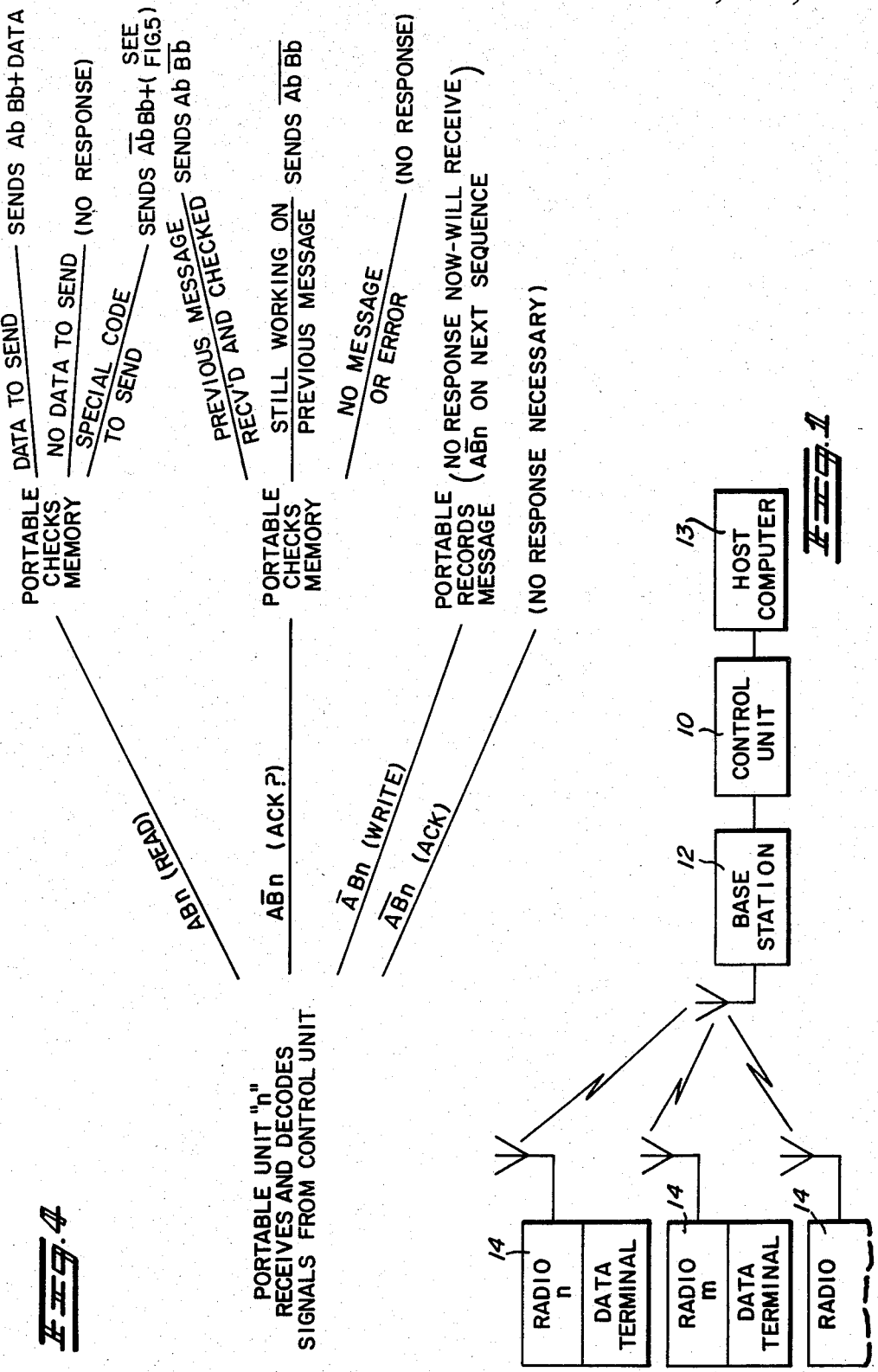
FIG. 1 is a block diagram of a entire system.

FIG. 1 shows a block diagram of a system such as might utilize the present invention. A Control Unit 10 is coupled to a base station 12 and via a radio link, to multiple radio/data terminals. It is to be noted that the present invention does not require a radio link and could be utilized with a multiplicity of data terminals which are hard-wired to the Control Unit.

The present invention is being utilized in an expanded communication system including a Host Computer 13 which communicates to the radio/data terminals via the Control Unit 10. This system is described more fully in a co-pending application U.S. Pat. No. 4,247,908 filed as of even date and assigned to the same assignee as is the present invention.

Figure 2:
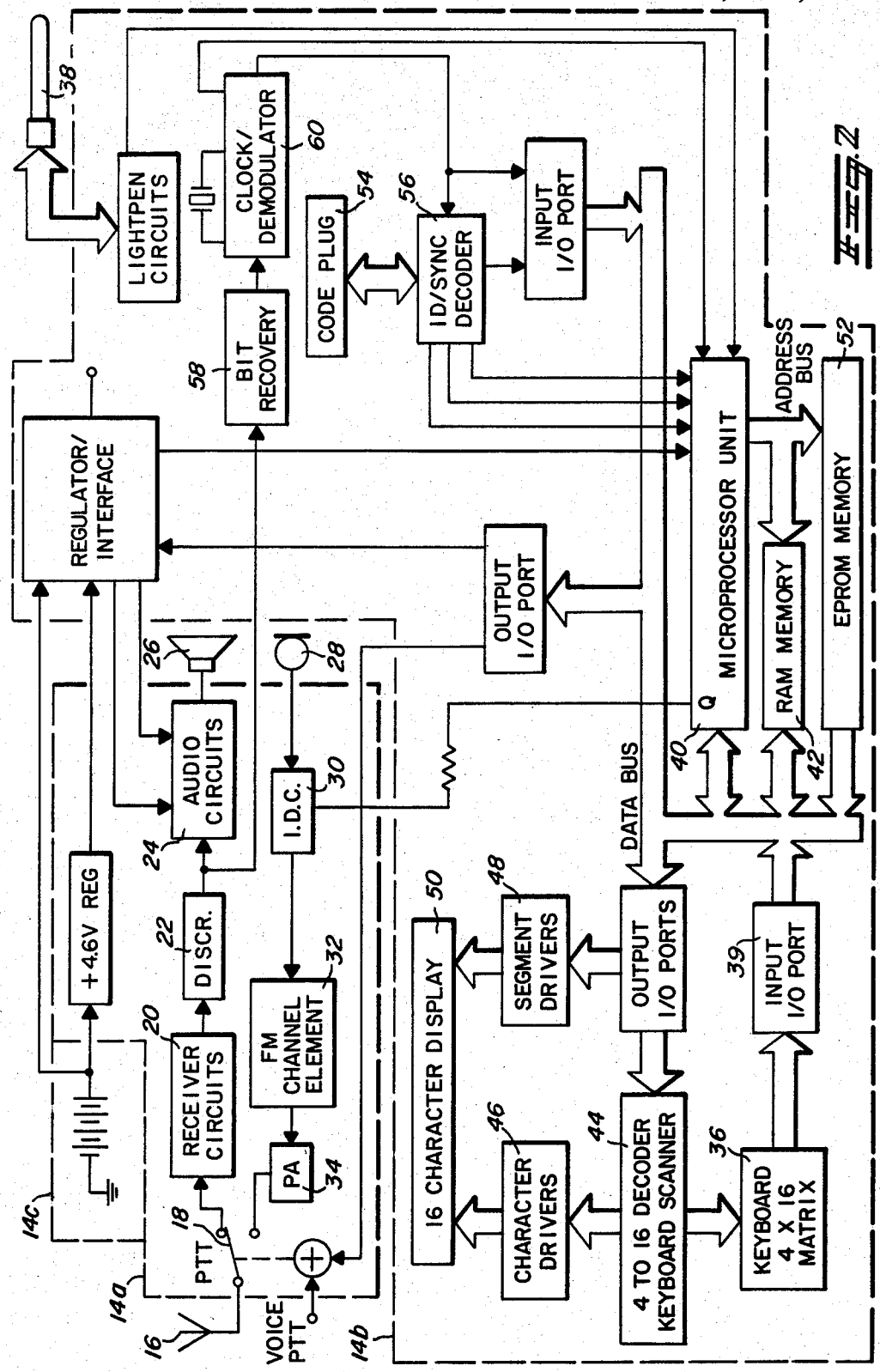
FIG. 2 is a block diagram of a terminal unit.

The block diagram of one of the radio/data terminals is shown in FIG. 2 and includes as major blocks a radio 14a, data terminal 14b and also a battery section 14c. The radio circuitry includes a common antenna 16 which is coupled through a PTT switch 18, normally in "receive" position. The radio is an FM transceiver, receiving and transmitting on different frequencies. The push-to-talk switch 18 may be activated by a manual push-to-talk switch if voice operation on a separate channel is desired or it may be activated automatically by the circuitry of the data terminal 14b. Received signals are coupled to receiver circuits 20 which would include RF stages, mixer, etc. and to discriminator 22. Audio signals are coupled through audio circuits 24 to a loud speaker 26. Outgoing signals may originate from a microphone 28 or the data terminal 14b, both being coupled to the instantaneous deviation control (IDC) 30. Blocks labeled FM channel element 32 and power amplifier 34 provide the usual shaping, modulating and amplifying functions of a transmitter.

Information can be inputed at the data terminal 14b via a keyboard 36 with 4×16 matrix or by a light pen 38 such as are used for reading black and white bar codes; e.g. Code 39. As the user of the terminal enters data at the keyboard 36 the information is coupled via data bus and input port 39 to the microprocessor unit 40 and RAM memory 42, where it is stored temporarily. When the user has completed entering information and corrected it if necessary, he then "arms" or activates the terminal unit so that data can be sent on to the Control Unit at the appropriate time as will be discussed hereinafter. As the user activates the keyboard 36, a decoder 44, character drivers 46 and segment drivers 48 provide a read-out of the entered information on a 16 character LED display 50. Programming for the microprocessor and its functions is provided by an EPROM memory 52. A unique two-word binary coded address is assigned to each terminal 14 and this address, as is known, can be stored in the unit via a code plug 54. Coupled to the code plug 54 is an ID/sync decoder 56 which will be discussed with regard to FIG. 3. Data signals from the discriminator 22 are coupled through a bit recovery circuit 58 and clock/demodulator circuit 60 to the microprocessor 40.

For a clearer understanding of the present invention, it will be necessary now to refer to two prior art patents upon which the present invention is based. U.S. Pat. No. 3,801,956 discloses a system for asynchronously detecting one code word within a stream of data bits by cycling the sampled bits of the received data in parallel with the bits of a stored code address word, then counting the number of correlations. U.S. Pat. No. 3,855,576 discloses a system using the asychronous detection of the first address word to provide sychronization for detection of the second address word. Thus only the first word need be one of a cylic subset, and a large number of code addresses are made available. In the latter patent, a technique is shown for encoding the address code to provide a maximum of four possible combinations of the two words of the address and their complements, detecting the four combinations and providing parallel outputs for each detect circuit. The detect circuit outputs are then coupled to an LED driver circuit, whereby a different character is displayed for each encoded message. For example, the unit might be a pager and when a "1" is displayed, the user would know to call his office; when a "2" is displayed he would call his home.

Only a brief description of the circuit of FIG. 3 will be given since it is given more fully in the two above-referenced patents. Signals at a terminal 65 have been received, demodulated and processed so that they are now a data bit stream having two levels. The clock 60 and a decoder timing generator 67 provide the timing signals for the entire circuit on entering, the signals are sampled at the control gate 68 (4 times in the patented circuit) and coupled to a sample register 69. The two-word address of the unit is stored in the code plug 54 and coupled to a address register in parity circuit 70 and serially to an EXOR 71. Incoming data is cycled through the sample register 69 and back through the control gate 68 during the time of one sampling period and is also coupled to the EXOR 71. The EXOR 71 therefore outputs in response to correlations, or in this case miscorrelations, of the two signals. The output of the EXOR 71 is coupled to a correlator/counter selector 72 and to a word correlator/sample counter 73. While the unit is looking for the first word of its address in the incoming data bit stream at terminal 65, the block 73 will function as a word correlator and when a predetermined number of correlations determines that the first word has been detected, a word flip-flop 74 causes a window counter 75 to be enabled through window counter enable flip-flop 76. The window counter 75 then counts a time period sufficient for a second word to have entered completely into sample register 69, and only during a specific window can the second word be detected, thus synchronization for the second word has been provided by the first word detect. If the second word is not detected during the window, the window counter enable flip-flop 76, the word flip-flop 74, and the window flip-flop 77 are reset so that the unit again looks for word one. Returning to the correlator/counter selector 72 and word correlator/ sample counter 73, these are programmed to detect not only the first word (A) and second word (B) but $\overline{A}$ and $\overline{B}$. When counting correlations or miscorrelations as the case may be, it is apparent that less than a given number of differences between two sets of samples would indicate that a desired word has been detected, and further errors would indicate that it has not been detected. However, if a large enough number of errors is detected this would indicate that the complement of the desired word has been detected. Thus the detection device will register detection of either word A or word $\overline{A}$ followed by the detection of words B or $\overline{B}$. An AND gate 78 is coupled to an output of the word correlator/sample counter 73 and also to an output of the word flip-flop 74. The output of the AND gate 78 is coupled to an inverted word flip-flop 79 having two outputs. One of these outputs stays "high" after a word A detect and is coupled to AND gates 80 and 81. A second output of the inverted word flip-flop 79 stays "high" after $\overline{A}$ is recognized and this indication is coupled to AND gates 82 and 83. The output from the word correlator/sample counter 73 which is coupled to the AND gate 78 is also coupled to the AND gates 81 and 83, this output being "high" at $\overline{A}$ or $\overline{B}$ detects. Another output of the word correlator/sample counter 73 is coupled to the AND gates 80 and 82 and this output is "high" when B is recognized. Finally, each of the AND gates 80-83 has an input from the window flip-flop 77 which is "high" only during the second word detect window. Thus the output of AND gate 80 will have a "high" upon detect of A B, AND gate 81 will output upon detect of A $\overline{B}$, AND gate 82 will output upon detect of $\overline{A}$ $\overline{B}$ and AND gate 83 will output upon detection of $\overline{A}$ $\overline{B}$.

A circuit like or similar to that of FIG. 3 is included in each terminal unit and in the Control Unit and unlike the prior art, is not coupled to a display unit. In the system using the present invention, these four address detects are coupled to the microprocessor and associated memories. In the programmed memory, are instructions for examining the condition of the terminal unit as ready to receive information or send information or working on information and not able to receive or send. Stored messages are checked and the detected combination of address words is examined in order to provide an appropriate output.

The flow chart of FIG. 4 shows a portable unit designated as "n" receiving and decoding signals from the Control Unit. If a signal which is simply the ABn address is detected, this is a "read" signal to the portable, meaning that the portable unit is to send any data it has stored and "armed" for transmission to the Control Unit. Upon this detect the portable unit "n" checks its memory and if it has data to send it sends back simply the address code of the Control Unit or Ab Bb, followed by the data. If the portable has no data to send it gives no response back to Control Unit. If, however, a portable unit user wishes to send a special message which is not to be handled in the normal fashion as will be described hereinafter, the portable unit sends $\overline{Ab}$Bb plus coded characters in the text field (see FIG. 5). If the portable unit decodes its address variation as $A\overline{B}n$ this is an ACK? or invitation-to-acknowledge signal. The portable checks its memory and if it has received previous message which was correct it automatically transmits back to the Control Unit Ab$\overline{B}$b. If the portable unit is still working on the previous message it automatically sends back $\overline{Ab}\overline{B}b$. If it has not received a message from the control unit (perhaps had been turned off) or the received message was in error, no response is forthcoming from the portable unit. If the portable unit detects $\overline{A}$Bn, this is a "write" command or "I am sending you a message". In this case, the portable records the message and no response is now required. It will receive an A$\overline{B}$n on the next polling sequence. If the portable unit detects $\overline{AB}$n or an ACK, this is an acknowledgement that a previous message had been received from the portable by the Control Unit and that the message was correct. Therefore, no response is necessary from the portable.

In the flow chart of FIG. 5 is seen the transmission from the Control Unit end. In order to fully understand this chart a brief discussion of "polling" is in order. The polling sequence is the subject of another co-pending application filed as of even date and assigned to the same assignee as is the present invention and is identified as U.S. Pat. No. 4,251,865, although it is not necessary to use the particular polling sequence shown in that invention. For additionally increased channel efficiency, all units in an active state are polled for data in a sequence with only a brief comma between addresses. A terminal unit detecting its address must answer (automatically) before the end of the subsequent address in the polling sequence. Thus, when it does respond, the Control Unit knows which terminal unit has responded and tags any subsequent data as coming from that particular unit.

If the detect circuit of the Control Unit, as shown in FIG. 3 and included in the ID/sync decoder 56 of the Control Unit, detects AbBb plus subsequent data, the Control Unit aborts the subsequent address in its sequence, identifies the sending terminal, stores and checks the message for accuracy. It then updates the status of the portable in the Control Unit memory and continues polling with the aborted address. On the next polling sequence, if the message received had been correct the Control Unit would send $\overline{AB}n$; if the message had been in error, it would send another poll for data or ABn. If the detected address code combination was Ab$\overline{B}$b, the Control Unit would identify the sending portable, update the status of the portable in the Control Unit memory, erase the previous message and on the next polling sequence would send AB$_n$, all while continuing the polling sequence. If the Control Unit detected $\overline{AbBb}$ (busy) the controller would identify the portable, update its status, hold any message for that unit in its memory and, on the next polling sequence and if there was any further message to send would send A$\overline{B}$n. If it had no further message to send the Control Unit would send ABn. If the Control Unit detected $\overline{AbBb}$ plus data, this would indicate to the Control Unit that a "special" message was being sent. The special message might vary according to a particular application but since the system with which the invention has been utilized includes the transmission of data to and from a Host Computer, the special function serves to disenable transmission of data to the host and enables the special function. Thus when this variation of address codes is received the controller aborts the subsequent address, identifies the sending portable and updates its status, then disenables transmission of data to the host and takes another look at the data following the address code. In the present embodiment there are three possibilities which may be found in the text field. These characters are initiated manually on the keyboard by the user of the terminal unit, and a "T" indicates the user is uncertain as to the link (preferably radio) between his terminal unit and the Control Unit. Thus the Control Unit, after disenabling transmission of data to the Host Computer sends a return message to the terminal unit which provides a test of the radio or other link. If the user of a terminal unit wishes to communicate with the user of another terminal unit "m", after initiating the special variation of the address code, he inserts "m" plus a character indicating the type of communication desired; i.e., "D" for digital communication and "V" for voice communication. When the Control Unit decodes "m, D" the Control Unit checks the status of terminal unit "m" to determine whether it can receive a message immediately or whether the Control Unit should wait. When it is appropriate, the Control Unit will send a message to terminal unit "m" which is a "canned" message saying that data is coming from terminal unit "n". If the Control Unit codes "m, V", the Control Unit again determines the status of terminal unit "m" and when appropriate sends a message to terminal unit "m", for read-out which says "switch to voice channel". In the preferred embodiment a separate radio channel is utilized for terminal-to-terminal voice communication.

Finally, if after a transmission of terminal "n" address requiring a response, the Control Unit receives no response, the controller will continue the polling sequence including "n" in each sequence for five minutes after its last activity. The terminal unit "n" is then tagged as inactive and is polled only periodically until the terminal responds.

Thus there has been shown and described a system for use in a two-way communications channel which allows the transmission of considerable information with efficiency provided by a Control Unit encoding the address of the receiving terminal unit to include considerable information. In turn, the terminal unit can send back automatically the appropriate response to each coded address combination in relation to its own status and to the data stored in its memories. Also the user of the terminal unit can initiate manually a special code which will disenable the normal function of the Control Unit, such as transmission to and from a Host Computer, and enable certain special functions such as radio link tests or transmission of messages to another terminal unit. Many modifications and variations of the present invention are possible and it is intended to include all such as are covered by the appended claims.

What is claimed is:

1. An arrangement for providing increased channel efficiency in a two-way communications system which incudes a Control Unit and a multiplicity of satellite units, each unit being addressable by a unique two-word address, and comprising in combination:

a two-way communications link coupled between the Control Unit and each satellite unit;

detector means in the Control Unit and in each satellite unit for detecting the two-word coded address of the respective unit in signals received from the link;

logic means coupled to each detector means for detecting the complement of each respective address code word;

memory means coupled to each detector means and logic means for storing any detected combination of the respective address words and the word complements, and any immediately subsequent data;

microprocessor means coupled to the memory means in each unit for automatically providing at least one appropriate response to each detected address combination;

transmission means coupled to each microprocessor means for transmitting said responses to the communications link; and manual input means in each satellite unit for entering into the respective memory at least one combination of the words and word complements of the Control Unit address for providing at least one appropriate response to one received and detected combination of the respective satellite unit address words and the word complements.

2. An arrangement for providing an increased channel efficiency in a two-way system in accordance with claim 1 which further includes a Host Computer coupled to the Control Unit, and wherein the memory means and microprocessor means in the Control Unit include means for encoding received information for transmission to the Host Computer.

3. An arrangement for providing increased channel efficiency in a two-way system according to claim 2 and wherein at least one combination of address words and word complements entered by a manual input means disenables transmission to the Host Computer.

4. An arrangement for providing increased channel efficiency in a two-way system in accordance with claim 1 wherein the two-way communication link is radio frequency transmission link.

5. An arrangement for providing increased channel efficiency in a two-way system in accordance with claim 1 wherein the memory means includes random access memory and read-only memory.

6. An arrangement for providing increased channel efficiency in a two-way system in accordance with claim 1 wherein each satellite unit includes display means for displaying received information and locally generated information.

* * * * *

UNITED STATES PATENT AND TRADEMARK OFFICE
CERTIFICATE OF CORRECTION

PATENT NO. : 4,641,364
DATED : February 3, 1987
INVENTOR(S) : Bass, et al.

It is certified that error appears in the above-identified patent and that said Letters Patent is hereby corrected as shown below:

In the list of Inventors on title page:

Please change "Macko" to read -- William John Macko --.

Signed and Sealed this

Twenty-ninth Day of March, 1988

Attest:

DONALD J. QUIGG

*Attesting Officer*           *Commissioner of Patents and Trademarks*